(12) United States Patent
Liu et al.

(10) Patent No.: US 11,983,539 B2
(45) Date of Patent: May 14, 2024

(54) METHOD FOR COMPUTING DEVICE MAINTENANCE, APPARATUS, STORAGE MEDIUM AND PROGRAM PRODUCT

(71) Applicant: HONG KONG SUNSTAR TECHNOLOGY CO., LIMITED, Hong Kong (CN)

(72) Inventors: Fuyi Liu, Hong Kong (CN); Yihao Peng, Hong Kong (CN); Lichun Guo, Hong Kong (CN); Wen He, Hong Kong (CN)

(73) Assignee: HONG KONG SUNSTAR TECHNOLOGY CO., LIMITED, Hong Kong (CN)

( * ) Notice: Subject to any disclaimer, the term of this patent is extended or adjusted under 35 U.S.C. 154(b) by 155 days.

(21) Appl. No.: 17/387,676

(22) Filed: Jul. 28, 2021

(65) Prior Publication Data
US 2021/0357233 A1    Nov. 18, 2021

Related U.S. Application Data

(63) Continuation of application No. PCT/CN2018/117667, filed on Nov. 27, 2018.

(51) Int. Cl.
*G06F 9/44* (2018.01)
*G06F 9/4401* (2018.01)
*G06F 11/30* (2006.01)
*G06F 11/32* (2006.01)
*G06F 11/34* (2006.01)

(52) U.S. Cl.
CPC .......... *G06F 9/4401* (2013.01); *G06F 11/328* (2013.01); *G06F 11/3495* (2013.01)

(58) Field of Classification Search
None
See application file for complete search history.

(56) References Cited

U.S. PATENT DOCUMENTS

| 9,148,479 B1 * | 9/2015 | Bhalerao ................. H04L 67/34 |
| 2007/0002730 A1 * | 1/2007 | Lu ....................... G06F 11/0793 |
| | | 370/216 |

(Continued)

FOREIGN PATENT DOCUMENTS

| CN | 101335650 A | 12/2008 |
| CN | 102148707 A | 8/2011 |

(Continued)

OTHER PUBLICATIONS

The Extended European Search Report for European Patent Application No. 18941360.2, dated Feb. 24, 2023.

(Continued)

*Primary Examiner* — Fahmida Rahman (57) ABSTRACT

A method for computing device maintenance, an apparatus, a storage medium and a program product. The method includes: monitoring an operating status of a computing device; and sending a notification message to a maintenance device if the computing device operates abnormally, where the notification message is used to notify that the computing device operates abnormally, and is used to notify to restart the computing device. The cost of human resources can be reduced, and stability and safety of operation of the computing device is improved to some extent.

10 Claims, 6 Drawing Sheets

Monitoring an operating status of a computing device — S102

Sending a notification message to a maintenance device if the computing device operates abnormally, where the notification message is used to notify that the computing device operates abnormally, and is used to notify to restart the computing device — S104

(56) References Cited

U.S. PATENT DOCUMENTS

2008/0162984 A1* 7/2008 Kalra ................ H04L 63/061
 714/4.11
2010/0174934 A1* 7/2010 Zhao ................ G06F 1/3203
 711/170
2017/0103458 A1* 4/2017 Pierce ................ G06Q 40/04

FOREIGN PATENT DOCUMENTS

| CN | 104243216 A | | 12/2014 |
|---|---|---|---|
| CN | 108647130 A | | 10/2018 |
| KR | 10-1758870 B1 | | 7/2017 |
| KR | 20190108452 A | * | 9/2019 |

OTHER PUBLICATIONS

"GitHub—justinmilone/CGWatcher: A GUI and monitor for cgminer and bfgminer", XP093021580, Web page URL: https://github.com/justinmilone/CGWatcher, May 1, 2013, pp. 1-7.

"CGWatcher 1.4.0, a GUI/monitor for CGMiner & BFGMiner to help minimize downtime", XP093021945, Web page URL:https://bitcointalk.org/index.php?topic=159267.0, Mar. 27, 2013, pp. 1-30.

\* cited by examiner

METHOD FOR COMPUTING DEVICE MAINTENANCE, APPARATUS, STORAGE MEDIUM AND PROGRAM PRODUCT

CROSS-REFERENCE TO RELATED APPLICATIONS

This application is a continuation of International Application No. PCT/CN2018/117667, filed on Nov. 27, 2018, which is hereby incorporated by reference in its entirety.

TECHNICAL FIELD

The present application relates to the field of data processing technologies, for example, to a method for computing device maintenance, an apparatus, a storage medium and a program product.

BACKGROUND

With the development of data technology and the progress of society, more people pay attention to performing data processing through computing devices to obtain digital certificates. Since a computing device operates in high speed, how to improve safety of the computing device becomes an importance research subject in the art.

At present, maintenance of abnormal computing devices is generally handled manually by users. It requires the user to actively pay close attention to or find out an operating status of the computing device, and when the operation of the computing device is found to be abnormal, a process of manually restarting is executed to the computing device, thereby implementing the maintenance of the computing device.

Existing method for computing device maintenance is implemented depending on manual operations of users, which wastes the cost of human resources and has a problem that abnormality of computing devices cannot be found in time, resulting in low stability and safety of operation of computing devices.

SUMMARY

An embodiment of the present disclosure provides a method for computing device maintenance, an apparatus, a storage medium and a program product, to reduce the cost of human resources and improve stability and safety of operation of computing devices.

In a first aspect, an embodiment of the present disclosure further provides a method for computing device maintenance, including:
 monitoring an operating status of a computing device; and
 sending a notification message to a maintenance device if the computing device operates abnormally, where the notification message is used to notify that the computing device operates abnormally, and is used to notify to restart the computing device.

In a possible design, the monitoring an operating status of a computing device includes:
 acquiring operating status information of the computing device; and
 determining whether the computing device operates abnormally according to the operating status information.

In another possible design, the operating status information includes: current data processing hash rate of the computing device.

In another possible design, the determining whether the computing device operates abnormally according to the operating status information includes:
 determining that the computing device operates abnormally if the current data processing hash rate is less than an abnormal hash rate threshold; or,
 determining that the computing device operates abnormally if a duration of the current data processing hash rate being less than the abnormal hash rate threshold reaches a duration threshold.

In another possible design, the method further includes: acquiring the abnormal hash rate threshold.

In another possible design, the acquiring the abnormal hash rate threshold includes:
 acquiring standard data processing hash rate of the computing device; and
 acquiring a product of the standard data processing hash rate and a preset abnormal ratio, to obtain the abnormal hash rate threshold.

In another possible design, the standard data processing hash rate includes: factory data processing hash rate or initial data processing hash rate.

In another possible design, the acquiring standard data processing hash rate of the computing device includes:
 acquiring factory data processing hash rate recorded by a data processing chip of the computing device, as the standard data processing hash rate.

In another possible design, the method further includes:
 receiving a restart instruction sent by the maintenance device according to the notification message; and
 controlling the computing device to restart according to the restart instruction.

In another possible design, the notification message carries at least one of the following information:
 operating status information of the computing device; and
 an abnormal operation identifier, the abnormal operation identifier being used to indicate that the computing device operates abnormally.

In a second aspect, an embodiment of the present disclosure further provides an apparatus for computing device maintenance, including:
 a monitoring module, configured to monitor an operating status of a computing device; and
 a sending module, configured to send a notification message to a maintenance device if the computing device operates abnormally, where the notification message is used to notify that the computing device operates abnormally, and is used to notify to restart the computing device.

In a possible design, the monitoring module is configured to:
 acquire operating status information of the computing device; and
 determine whether the computing device operates abnormally according to the operating status information.

In another possible design, the operating status information includes: current data processing hash rate of the computing device.

In another possible design, the monitoring module is specifically configured to:
 determine that the computing device operates abnormally if the current data processing hash rate is less than an abnormal hash rate threshold; or,
 determine that the computing device operates abnormally if a duration of the current data processing hash rate being less than the abnormal hash rate threshold reaches a duration threshold.

In another possible design, the monitoring module is further configured to:
acquire the abnormal hash rate threshold.

In another possible design, the monitoring module is specifically configured to:
acquire standard data processing hash rate of the computing device; and
acquire a product of the standard data processing hash rate and a preset abnormal ratio, to obtain the abnormal hash rate threshold.

The standard data processing hash rate includes: factory data processing hash rate or initial data processing hash rate.

In another possible design, the monitoring module is specifically configured to:
acquire factory data processing hash rate recorded by a data processing chip of the computing device, as the standard data processing hash rate.

In another possible design, the apparatus further includes:
a receiving module, configured to receive a restart instruction sent by the maintenance device according to the notification message; and
a controlling module, configured to control the computing device to restart according to the restart instruction.

In the embodiments of the present disclosure, the notification message carries at least one of the following information:
operating status information of the computing device; and
an abnormal operation identifier, the abnormal operation identifier being used to indicate that the computing device operates abnormally.

In a third aspect, an embodiment of the present disclosure further provides an electronic device, including: a memory, a transceiver and a processor, where the memory, the transceiver and the processor are connected through a bus;
the memory is configured to store computer programs;
the transceiver is configured to communicate with other devices; and
the processor is configured to execute the computer programs to implement the method according to any one of implementations of the first aspect.

In a possible design, the processor is configured to monitor an operating status of a computing device; and
the transceiver is configured to send a notification message to a maintenance device if the computing device operates abnormally, where the notification message is used to notify that the computing device operates abnormally, and is used to notify to restart the computing device.

In a possible design, the processor is specifically configured to:
acquire operating status information of the computing device; and
determine whether the computing device operates abnormally according to the operating status information.

In another possible design, the operating status information includes: current data processing hash rate of the computing device.

In another possible design, the processor is specifically configured to:
determine that the computing device operates abnormally if the current data processing hash rate is less than an abnormal hash rate threshold; or,
determine that the computing device operates abnormally if a duration of the current data processing hash rate being less than the abnormal hash rate threshold reaches a duration threshold.

In another possible design, the processor is further configured to:
acquire the abnormal hash rate threshold.

In another possible design, the processor is specifically configured to:
acquire standard data processing hash rate of the computing device; and
acquire a product of the standard data processing hash rate and a preset abnormal ratio, to obtain the abnormal hash rate threshold.

In another possible design, the standard data processing hash rate includes: factory data processing hash rate or initial data processing hash rate.

In another possible design, the processor is specifically configured to:
acquire factory data processing hash rate recorded by a data processing chip of the computing device, as the standard data processing hash rate.

In another possible design, the transceiver is further configured to receive a restart instruction sent by the maintenance device according to the notification message; and
the processor is further configured to control the computing device to restart according to the restart instruction.

In another possible design, the notification message carries at least one of the following information:
operating status information of the computing device; and
an abnormal operation identifier, the abnormal operation identifier being used to indicate that the computing device operates abnormally.

In a fourth aspect, an embodiment of the present disclosure further provides a computer-readable storage medium storing a computer-executable instruction, where the computer-executable instruction is set to execute the above method for computing device maintenance.

In a fifth aspect, an embodiment of the present disclosure further provides a computer program product including computer programs stored on a computer-readable storage medium, where the computer programs include program instructions which, when executed by a computer, cause the computer to execute the above method for computing device maintenance.

In the above technical solutions provided by the embodiments of the present disclosure, an operating status of a computing device is monitored, and thus a notification message used to notify that the computing device operates abnormally can be sent to a maintenance device if the computing device operates abnormally, so as to cause the maintenance device to restart the computing device according to the notification message. In this way, restart of the computing device when the computing device operates abnormally is enabled without a user subjectively observing or monitoring the operating status of the computing device and executing a restart processing manually, which saves the cost of human resources, and by way of automatically monitoring, whether the computing device operates abnormally is able to be found out more timely, so as to process the computing device in time, which improves the stability and safety of operation of the computing device to some extent.

BRIEF DESCRIPTION OF DRAWINGS

One or more embodiments are illustratively described with reference to corresponding drawings, and the illustrative description and the drawings do not constitute limitations to the embodiments. Elements with the same reference numerals are shown as similar elements in the drawings, and a scale limitation is not constituted in the drawings, and where.

DESCRIPTION OF EMBODIMENTS

In order to understand the characteristics and technical contents of the embodiments of the present disclosure in more detail, the implementation of the embodiments of the present disclosure will be described in detail with reference to the accompanying drawings which are for reference only and are not used to limit the embodiments of the present disclosure. In the following technical description, for convenience of illustration, multiple details are set forth in order to provide a thorough understanding of the disclosed embodiments. However, one or more embodiments may still be implemented without these details. In other cases, in order to simplify the drawings, well-known structures and apparatuses may be displayed in a simplified form.

The method for computing device maintenance, the electronic device, the computer-readable storage medium and the computer program product provided by embodiments of the present disclosure is intended to solve a problem existing in a current method for computing device maintenance of human resource waste and low stability and safety of operation of a computing device, and provide the following solving ideas: an operating status of a computing device is automatically monitored, and when the computing device operates abnormally, a notification message is automatically sent to a maintenance device, so that the maintenance device can restart the computing device according to the notification message.

An embodiment of the present disclosure provides a method for computing device maintenance.

Figure 1:
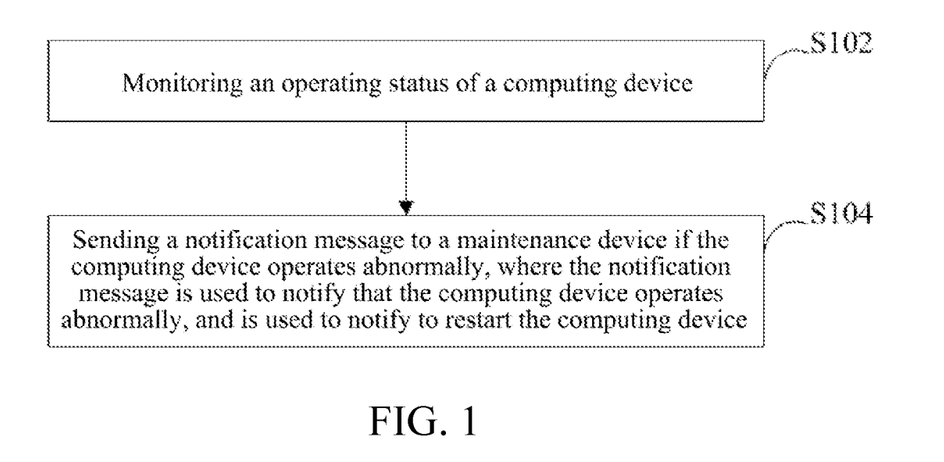
FIG. 1 is a schematic flowchart of a method for computing device maintenance provided by an embodiment of the present disclosure.

FIG. 1 shows a schematic flowchart of a method for computing device maintenance provided by an embodiment of the present disclosure, the method including following steps:

S102: monitoring an operating status of a computing device.

It is known that, the step is mainly used to automatically monitor whether the computing device operates abnormally, and if the computing device operates abnormally, S104 is executed; and on the contrary, if the computing device operates normally, the monitoring status is kept, and a subsequent step S104 does not need to be executed.

S104: sending a notification message to a maintenance device if the computing device operates abnormally, where the notification message is used to notify that the computing device operates abnormally, and is used to notify to restart the computing device.

First, an executive device executing the method for computing device maintenance is described, and the executive device can be integrated in a computing device, and can be a processor or a processing unit in the computing device.

Or, in a feasible design, the executive device can be integrated in a maintenance device, and can be a processor or a processing module in the maintenance device. At this time, the maintenance device can have two processors. One can be configured to execute the method for computing device maintenance provided by the embodiments of the present disclosure, and the other processor can be configured to restart the processors according to the notification message; or, both can be different processing modules in a same processor.

Second, the computing device involved in the present disclosure is a device having an ability of computing and processing. In a specific scenario, the computing device involved in the embodiments of the present disclosure can be specifically applied to an application scenario of obtaining digital certificates through data processing.

It should be noted that, in the embodiments of the present disclosure, when the executive device executing the method for computing device maintenance is integrated into a computing device, the computing device monitored in step S102 can be the computing device for the current integration purpose. However, if the executive device is integrated into the maintenance device, an amount of the computing device monitored in S102 is at least one, and the embodiments of the present disclosure does not specifically limit an Internet protocol (IP) address range of these monitored computing devices, which can be all computing devices that can be monitored at present, or can be part of computing devices that are specified.

In the following, for the convenience of description, that the executive device is set in the computing device is taken as an example to describe implementations of the above steps. It is known that, when the executing device is set in the maintenance device, implementations of respective steps are the same and will not be repeated.

In the embodiments of the present disclosure, monitoring the operating status of the computing device can be implemented through operating status information of the computing device. Specifically, referring to FIG. 2, S102 may include the following steps:

S1022: acquiring operating status information of the computing device; and

Figure 2:
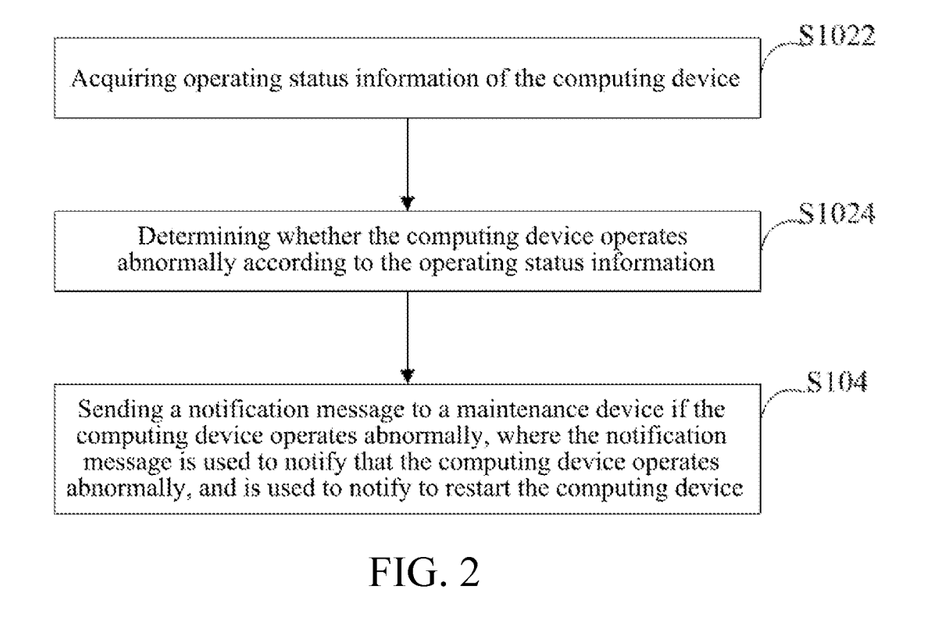
FIG. 2 is a schematic flowchart of another method for computing device maintenance provided by an embodiment of the present disclosure.

S1024: determining whether the computing device operates abnormally according to the operating status information.

The operating status information is used to represent the operating status of the computing device. In the embodiments of the present disclosure, the operating status information can include, but is not limited to: current data processing hash rate.

Figure 3:
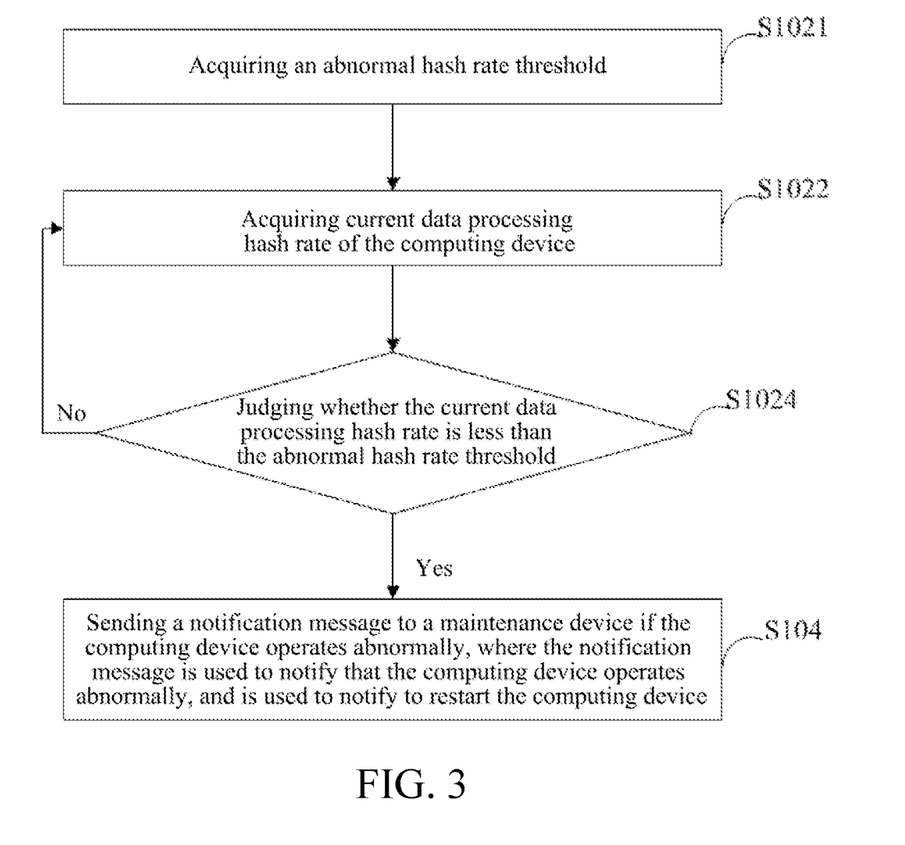
FIG. 3 is a schematic flowchart of yet another method for computing device maintenance provided by an embodiment of the present disclosure.

At this time, in another feasible scenario, referring to FIG. 3, S102 in the method can be implemented through following steps:

S1022: acquiring current data processing hash rate of the computing device; and S1024: judging whether the current data processing hash rate is less than an abnormal hash rate threshold.

If the current data processing hash rate is less than the abnormal hash rate threshold, it is determined that the computing device operates abnormally, and at this time, S104 is executed.

If the current data processing hash rate is not less than the abnormal hash rate threshold, it is determined that the computing device operates normally, and at this time, S1022 is executed.

Through the above method, real time judgment can be performed according to the currently obtained current data processing hash rate of the computing device, and the timeliness of the detection is improved.

Figure 4:
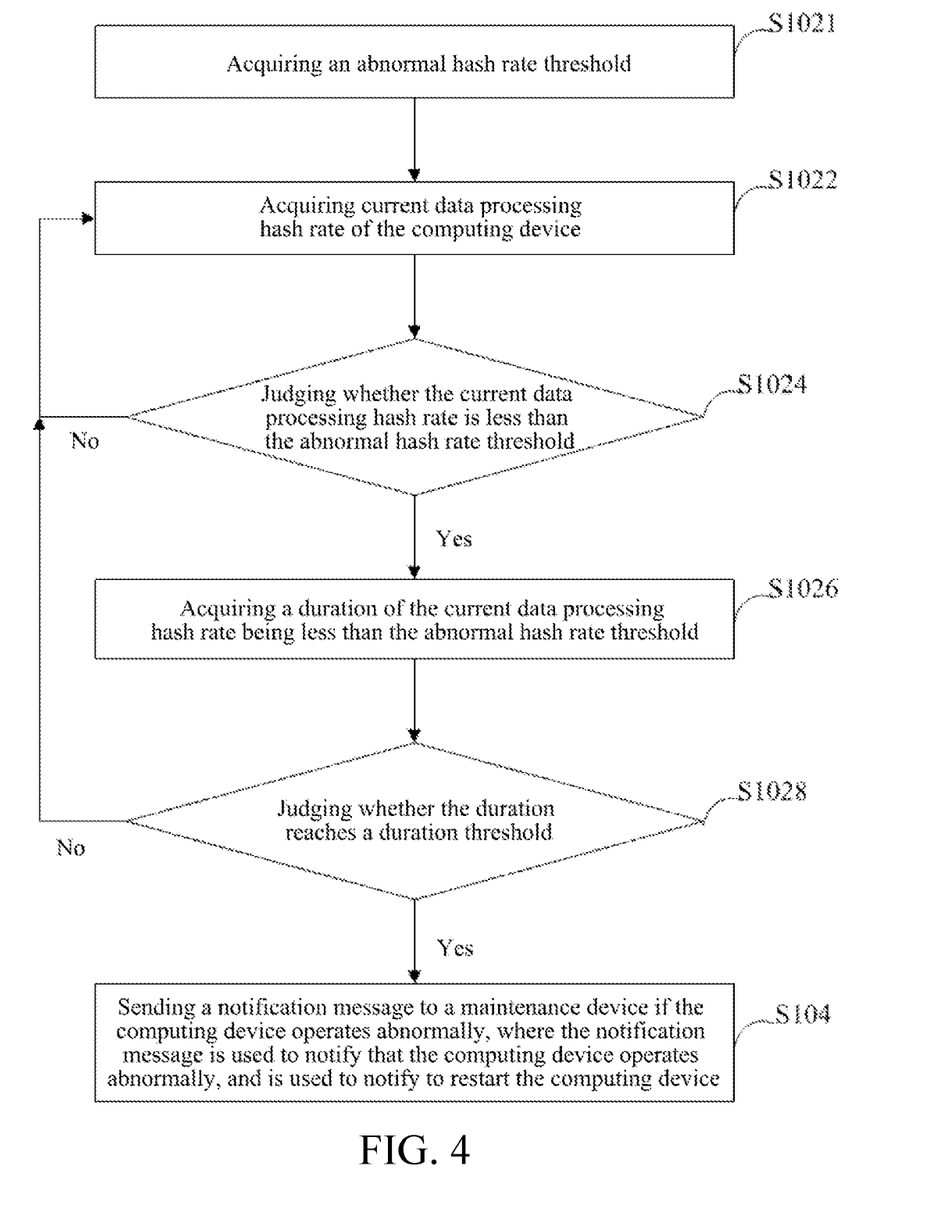
FIG. 4 is a schematic flowchart of yet another method for computing device maintenance provided by an embodiment of the present disclosure.

In addition, to avoid circumstances of errors in monitoring result caused by temporary abnormal data processing hash rate, an embodiment of the present disclosure further provides another implementation, and referring to FIG. 4, S102 in the method can include the following steps:

S1022: acquiring standard data processing hash rate of the computing device;

S1024: judging whether the current data processing hash rate is less than an abnormal hash rate threshold; if the current data processing hash rate is less than the abnormal hash rate threshold, executing S1026, and if the current data processing hash rate is not less than the abnormal hash rate threshold, executing S1022; and S1026: acquiring a duration of the current data processing hash rate being less than the abnormal hash rate threshold.

It should be noted that, in this step, a start moment of time reckoning can be a moment at which it is first judged that the data processing hash rate is less than the abnormal hash rate threshold. When the step is executed, steps S1022 and S1024 are continuously executed, so that after the time reckoning starts, if a circumstance that the data processing hash rate is greater than or equal to the abnormal hash rate threshold occurs, a moment at which that the data processing hash rate is greater than or equal to the abnormal hash rate threshold occurs is taken as an end of the time reckoning, to obtain the duration; and on the contrary, if after the time reckoning starts, the current data processing hash rate obtained in the foregoing step is continuously less than the abnormal hash rate threshold, a current moment is taken as an end of the time reckoning, to obtain the duration.

S1028: judging whether the duration reaches a duration threshold; if the duration reaches the duration threshold, executing S104; and if the duration does not reach the duration threshold, executing S1022.

The duration threshold can be preset according to needs, for example, can be preset as 15 minutes.

In the implementation shown in FIG. 4, an occasionally occurred circumstance of a monitoring result error caused by abnormal data processing hash rate can be avoided to some extent, and the accuracy of monitoring can be improved to some extent.

In addition, as shown in FIG. 3 and FIG. 4, before step S1024 is executed, the method may include the following steps:

S1021: acquiring the abnormal hash rate threshold.

It should be noted that, the embodiments of the present disclosure do not specifically limit an execution order of S1022 and S1021, the method shown in FIG. 3 and FIG. 4 is only a possible implementation, and is not used to limit the embodiments of the present disclosure. For example, S1022 and S1021 can be executed at a same time, or S1022 can be executed first before S1021 is executed.

The implementation of the step is related to a way of setting the abnormal hash rate. The way of setting the abnormal hash rate can include, but is not limited to: presetting a value, or, obtained by a preset algorithm.

If the abnormal hash rate threshold is set through presetting, when the step is executed, the abnormal hash rate threshold can be obtained by directly reading preset data. Specifically, when being specifically preset, the abnormal hash rate threshold can be preset as a fixed value.

If the abnormal hash rate threshold is preset through algorithm, when the step is executed, the preset algorithm can be directly executed.

Figure 5:
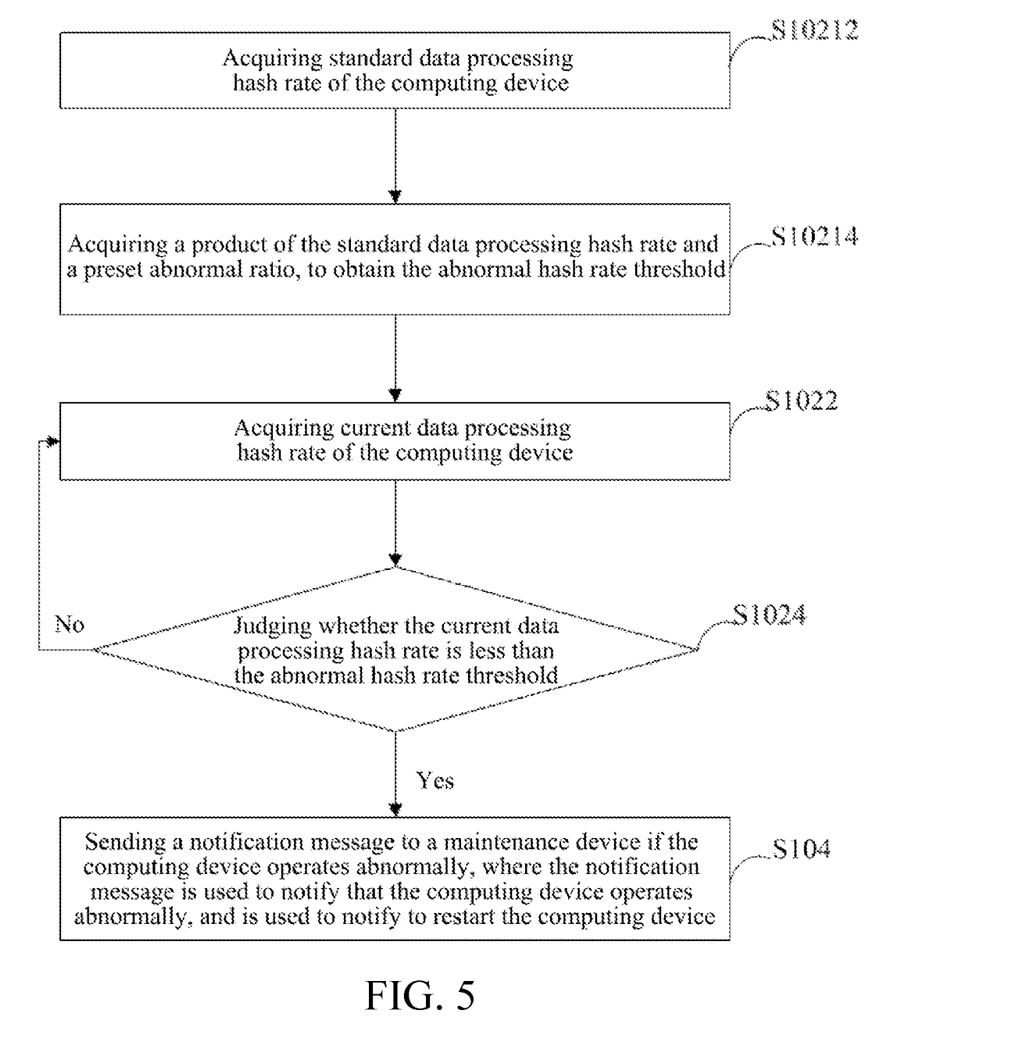
FIG. 5 is a schematic flowchart of yet another method for computing device maintenance provided by an embodiment of the present disclosure.

For better understanding, an embodiment of the present disclosure provides a preferable implementation of S1021, and referring to FIG. 5, the method specifically includes:

S10212: acquiring standard data processing hash rate of the computing device; and S10214: acquiring a product of the standard data processing hash rate and a preset abnormal ratio, to obtain the abnormal hash rate threshold.

The standard data processing hash rate may include: factory data processing hash rate or initial data processing hash rate.

The factory data processing hash rate can be the standard hash rate value when the computing device leaves the factory, at this time, when S10212 is specifically implemented, the factory data processing hash rate recorded by a data processing chip of the computing device can be obtained as the standard data processing hash rate.

In addition, considering that the factory data processing hash rate is a value written in firmware right after leaving the factory, therefore, an error may exist compared to actual standard hash rate of the data processing chip of the computing device, and therefore, when the above step S10212 is executed, chip status information (which may include but is not limited to a chip operating frequency) recorded by the data processing chip of the computing device can be further obtained, and then reference data processing hash rate is calculated and obtained using the chip status information, so that if an difference between the above-mentioned factory data processing hash rate and the reference data processing hash rate is less than 5% (which can be 5% of the factory data processing hash rate or 5% of the reference data processing hash rate, which is not specifically limited), the factory data processing hash rate is obtained as the standard data processing hash rate.

The initial data processing hash rate is data processing hash rate when the computing device initially starts to operate. The initial data processing hash rate can be recorded in the background of the computing device, or the data processing chip of the computing device.

Since the above-mentioned data is all recorded in the background of the computing device or the data processing chip of the computing device, the information can be obtained through an application programming interface (API). Or, if the executive device is set at a maintenance device side, the information can also be obtained by establishing communication, where a communication mode can include, but is not limited to: at least one of wired communication and wireless communication.

The above-mentioned abnormal ratio can be set according to needs, and a specific value of the above-mentioned abnormal ratio is not limited by the embodiments of the present disclosure. For example, the value can be set as 80%. That is, when the current data processing hash rate of the computing device is less than 80% of the standard data processing hash rate, or the duration of the current data processing hash rate of the computing device being less than 80% of the standard data processing hash rate reaches the preset duration, it can be determined that the computing device operates normally.

Based on the monitoring in step S102, for a determined abnormal computing device in S102, in an embodiment of the present disclosure, S104 is executed, and by sending the notification message, the maintenance device is notified to perform maintenance to the abnormally operating computing device, that is, the maintenance device can restart the computing device.

In an embodiment of the present disclosure, the submitted notification message can carry at least one of the following information:

operating status information of the computing device; and
an abnormal operation identifier, the abnormal operation identifier being used to indicate that the computing device operates abnormally.

If the notification message only carries the operating status information of the computing device, the maintenance device having received the notification message can process the operating status information through the above-mentioned algorithm, to determine that the computing device operates abnormally, and at this time, maintenance can be performed to the abnormally operating computing device. With such processing, higher accuracy is provided through a secondary verification by the maintenance device, and the operating stability of the computing device is improved.

If the notification message only carries the abnormal identifier, the maintenance device having received the notification message does not need to execute a secondary detection and judgment, and it can be determined through the abnormal identifier that the computing device operates abnormally, and maintenance can be directly performed to the computing device, which has high processing efficiency.

In addition, the notification message can also carry both the above-mentioned two messages at a same time, the abnormal operation can be determined according to at least one of the above-mentioned modes, and maintenance can be performed, which is not repeated here.

Figure 6:
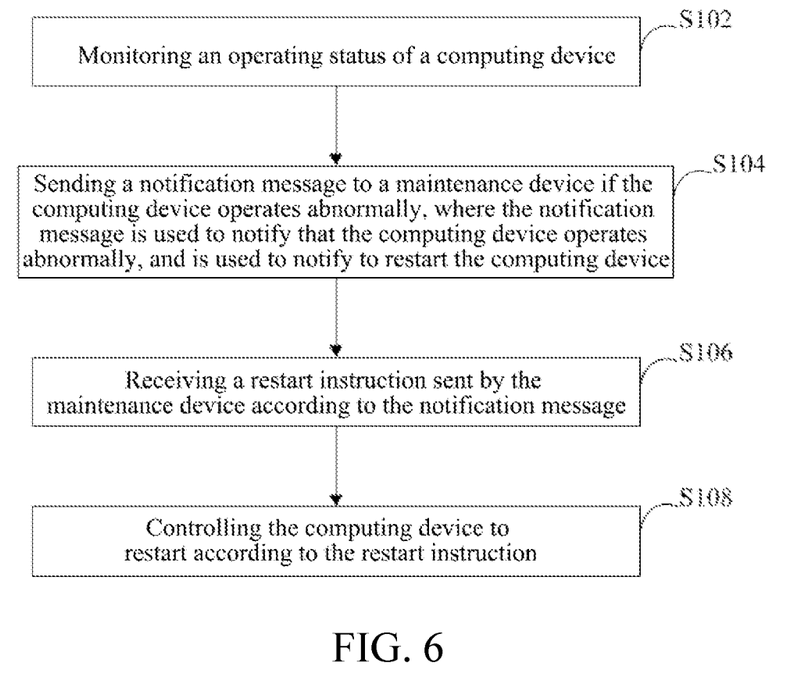
FIG. 6 is a schematic flowchart of yet another method for computing device maintenance provided by an embodiment of the present disclosure.

For the notification message sent based on S104, if the maintenance device sends a restart instruction according to S104, referring to FIG. 6, the method can further include the following steps:

S106: receiving a restart instruction sent by the maintenance device according to the notification message; and
S108: controlling the computing device to restart according to the restart instruction.

Specifically, the embodiments of the present disclosure do not specifically limit a mode of controlling the computing device to restart, which can be implemented by cold restart, that is, be implemented by cutting off power and restarting; or can be implemented by warm restart, that is, the computing device is controlled to execute the restart operation under a condition that power is not cut off.

In addition, in an embodiment of the present disclosure, after S102 is executed, a notification signal can be output, for the convenience of the user to acknowledge that the computing device operates abnormally according to the notification signal. The notification signal involved in the embodiment of the present disclosure may include, but is not limited to: at least one of a voice signal, a vibration signal, a flashing signal and text notification information. In addition, if the executive device is integrated into the maintenance device, any one of the above-mentioned at least one notification signal can also be output, in addition, if monitoring of multiple computing devices is related to, related information enabling identification of an identity of a computing device, for example, a serial number, an IP address of the computing device, etc., can be further output.

Based on the above-mentioned method for computing device maintenance, an embodiment of the present disclosure further provides an electronic device.

Figure 7:
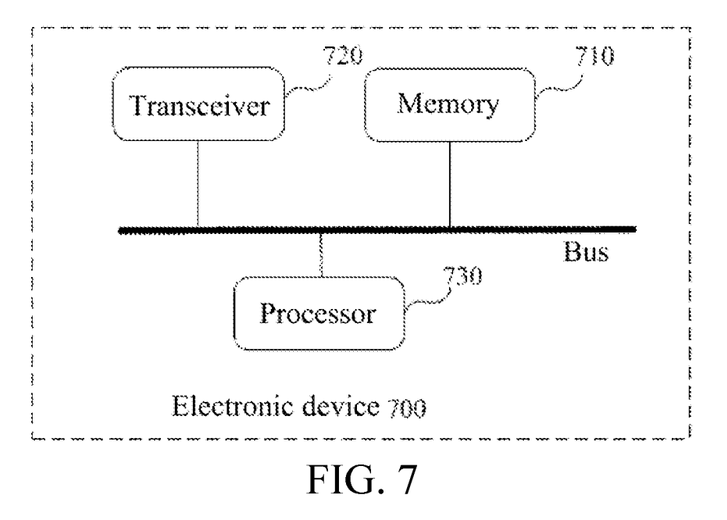
FIG. 7 is a structural schematic diagram of an electronic device provided by an embodiment of the present disclosure.

Referring to FIG. 7, an electronic device 700 includes: a memory 710, a transceiver 720 and a processor 730, where the memory 710, the transceiver 720 and the processor 730 are connected through a bus;

the memory 710 is configured to store computer programs;
the transceiver 720 is configured to communicate with other devices; and
the processor 730 is configured to execute the computer programs to implement the method for computing device maintenance according to any one of the above-mentioned embodiments.

In a possible design, the processor 730 is configured to monitor an operating status of a computing device; and
the transceiver 720 is configured to send a notification message to a maintenance device if the computing device operates abnormally, where the notification message is used to notify that the computing device operates abnormally, and is used to notify to restart the computing device.

In a possible design, the processor 730 is specifically configured to:
acquire operating status information of the computing device; and
determine whether the computing device operates abnormally according to the operating status information.

In another possible design, where the operating status information includes: current data processing hash rate of the computing device.

At this time, the processor 730 is specifically configured to:
determine that the computing device operates abnormally if the current data processing hash rate is less than an abnormal hash rate threshold; or,
determine that the computing device operates abnormally if a duration of the current data processing hash rate being less than the abnormal hash rate threshold reaches a duration threshold.

In another possible design, the processor 730 is further configured to:
acquire the abnormal hash rate threshold.

In a possible design, the processor 730 is specifically configured to:
acquire standard data processing hash rate of the computing device; and
acquire a product of the standard data processing hash rate and a preset abnormal ratio, to obtain the abnormal hash rate threshold.

The standard data processing hash rate include: factory data processing hash rate or initial data processing hash rate.

In another possible design, the processor 730 is specifically configured to:
acquire factory data processing hash rate recorded by a data processing chip of the computing device, as the standard data processing hash rate.

In addition, in another possible design, the transceiver 720 is further configured to receive a restart instruction sent by the maintenance device according to the notification message; and the processor 730 is further configured to control the computing device to restart according to the restart instruction.

In the embodiments of the present disclosure, the notification message carries at least one of the following information:

operating status information of the computing device; and
an abnormal operation identifier, the abnormal operation identifier being used to indicate that the computing device operates abnormally.

In the embodiment of the present disclosure, logic instructions in the above memory 710 can be implemented in a form of a software functional unit, and when sold or used as independent products, can be stored in a computer-readable storage medium.

As a computer-readable storage medium, the memory 710 can be configured to store software programs, computer-executable programs, such as program instructions/modules corresponding to the method in the embodiments of the present disclosure. The processor 730 executes functional applications and data processing by running software programs, instructions and modules stored in the memory 710, that is, to implement the method for computing device maintenance in the embodiments of the above method.

The memory 710 may include a program-storage section and a data-storage section, where the program-storage section can store an operating system, an application program required by at least one function; the data-storage section can store data created according to the usage of a terminal device, etc. In addition, the memory 710 may include a high-speed random access memory, and may also include a non-volatile memory.

In the embodiments of the present disclosure, a number of the processor 730 can be one or more, and the processor 730 can also be called as a processing unit, which can implement some control functions. The processor 730 can be a general processor or a special processor, etc.

In an optional design, the processor 730 can store instructions, and the instructions are runnable on the processor to cause the electronic device 700 to execute the method for computing device maintenance as described in the above method embodiments.

In yet another possible design, the electronic device 700 can include a circuit, the circuit being able to implement the function of sending or receiving or communicating in the above method embodiments.

In the embodiments of the present disclosure, a number of the transceiver 720 can be one or more, and the transceiver 720 can be called as a transceiver unit, a transceiver machine, a transceiver circuit, or a transceiver etc., which is configured to implement the sending and receiving functions of the electronic device 700.

If the electronic device 700 is configured to implement operations corresponding to the method for computing device maintenance in the embodiments shown in FIG. 1, for example, the operation can be that the transceiver 720 sends the notification message to the maintenance device. The transceiver 720 can further complete other corresponding communication functions.

Specific processing of respective components can be referred to in related descriptions of the above embodiments.

The processor 730 and the transceiver 720 described in the embodiments of the present disclosure can be implemented in an integrated circuit (IC), a simulated IC, a radio frequency integrated circuit RFIC, a hybrid signal IC, an application specific integrated circuit (ASIC), a printed circuit board (PCB), an electronic device, etc. The processor and the transceiver can be manufactured by using various IC process technologies, for example, complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs), etc.

Optionally, the electronic device 700 can be an independent device or can be a part of a large device. For example, the electronic device 700 can be integrated into a computing device.

Figure 8:
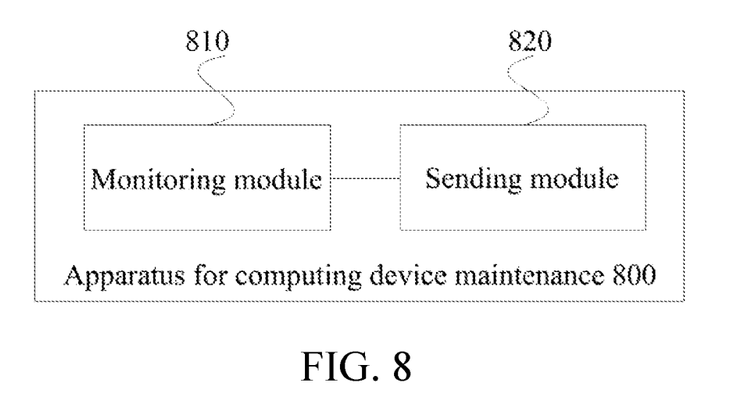
FIG. 8 is a structural schematic diagram of an apparatus for computing device maintenance provided by an embodiment of the present disclosure.

In addition, an embodiment of the present disclosure further provides an apparatus for computing device maintenance, and referring to FIG. 8, an apparatus 800 for computing device maintenance includes:

a monitoring module 810, configured to monitor an operating status of a computing device; and
a sending module 820, configured to send a notification message to a maintenance device if the computing device operates abnormally, where the notification message is used to notify that the computing device operates abnormally, and is used to notify to restart the computing device.

In a possible design, the monitoring module 810 is configured to:

acquire operating status information of the computing device; and
determine whether the computing device operates abnormally according to the operating status information.

In another possible design, the operating status information includes: current data processing hash rate of the computing device.

In another possible design, the monitoring module 810 is specifically configured to:

determine that the computing device operates abnormally if the current data processing hash rate is less than an abnormal hash rate threshold; or,
determine that the computing device operates abnormally if a duration of the current data processing hash rate being less than the abnormal hash rate threshold reaches a duration threshold.

In another possible design, the monitoring module 810 is further configured to:

acquire the abnormal hash rate threshold.

In another possible design, the monitoring module 810 is specifically configured to:

acquire standard data processing hash rate of the computing device; and
acquire a product of the standard data processing hash rate and a preset abnormal ratio, to obtain the abnormal hash rate threshold.

The standard data processing hash rate include: factory data processing hash rate or initial data processing hash rate.

In another possible design, the monitoring module 810 is specifically configured to:

acquire factory data processing hash rate recorded by a data processing chip of the computing device, as the standard data processing hash rate.

In another possible design, the apparatus 800 for computing device maintenance further includes:

a receiving module (not shown in FIG. 8), configured to receive a restart instruction sent by the maintenance device according to the notification message; and
a controlling module (not shown in FIG. 8), configured to control the computing device to restart according to the restart instruction.

In the embodiments of the present disclosure, the notification message carries at least one of the following information:

operating status information of the computing device; and
an abnormal operation identifier, the abnormal operation identifier being used to indicate that the computing device operates abnormally.

It should be noted that, in an embodiment of the present disclosure, no matter in which aspect, such as a method aspect and an apparatus aspect, etc., the data processing described in an embodiment of the present disclosure can include at least one of setting, calculation, judging, transmission, storage, management, etc. based on or of data As an embodiment, the data processing can be data processing related to digital certificate and performed by the data processing apparatus, where the digital certificate can be obtained by the data processing, and the data processing apparatus can be a digital certificate processing apparatus.

When the digital certificate is related to digital currency or is embodied as digital currency, the digital certificate processing apparatus can be a digital currency data processing machine, where the digital currency can be a cryptocurrency such as bitcoin.

In addition, an embodiment of the present disclosure further provides a computer-readable storage medium, storing a computer-executable instruction, and the computer-executable instruction is used to execute the above method for computing device maintenance.

An embodiment of the present disclosure further provides a computer program product, the computer program product including computer programs stored on a computer-readable storage medium, where the computer programs include computer instructions which, when being executed by a computer, cause the computer to execute the above method for computing device maintenance.

The computer-readable storage medium can be a transient computer-readable storage medium or a non-transient computer readable storage medium.

The technical solution of the embodiment of the present disclosure can be embodied in a form of software product, where the computer software product is stored in a storage medium, including one or more instructions being used to cause a computer device (can be a personal computer, a server, or a network device, etc.) to execute all of or part of steps of the method according to the embodiments of the present disclosure. And the above-mentioned storage medium can be various media able to store program codes such as a non-transient storage medium, including: a U disk, a mobile hard disk, a read-only memory (ROM), a random access memory (RAM), a magnetic disk or an optical disk, etc., and can also be a transient storage medium.

When used in embodiments of the present disclosure, although the terms "first", "second", etc., may be used in embodiments of the present disclosure to describe various elements, these elements should not be limited by these terms. These terms are only used to distinguish one element from another. For example, without changing the meaning of the description, a first element can be called a second element, and a second element can be called a first element as long as all occurrences of "first element" are renamed uniformly and all occurrences of "second element" are renamed uniformly. The first element and the second element are both elements, but may not be same elements.

The words used in the embodiments of the present disclosure are only used to describe the embodiments and are not used to limit the claims. As used in the description of the embodiments and claims, the singular forms "a", "an" and "the" are intended to include the plural forms as well, unless the context clearly indicates otherwise. Similarly, the term "and/or" as used in embodiments of the present disclosure is meant to include any and all possible combinations of one or more associated listings. In addition, when used in embodiments of the present disclosure, the term "comprise" and its variants "comprises" and/or "comprising" refer to the presence of stated features, integral, steps, operations, elements, and/or components, but do not exclude one or more other features, integral, steps, operations, elements and/or components.

Various aspects, implementations, realizations or features in the described embodiments can be used alone or in any combination. Various aspects described in the embodiments can be implemented by software, hardware, or a combination of software and hardware. The described embodiments may also be embodied by a computer-readable medium storing computer-readable codes including instructions executable by at least one computing device. The computer-readable medium can be associated with any data storage device capable of storing data that is readable by a computer system. Examples of computer-readable media may include read-only memory, random access memory, CD-ROM, HDD, DVD, magnetic tape, and optical data storage devices etc. The computer-readable medium can also be distributed in computer systems connected through a network, so that the computer-readable code can be stored and executed in a distributed manner.

The above technical descriptions can be made with reference to the accompanying drawings, which form a part of embodiments of the present disclosure, and in which implementations according to the described embodiments are shown by way of description. Although these embodiments are described in detail enough to enable those of skills in the art to implement the embodiments, but the embodiments are non-restricted; in this way other embodiments can be used and changes are allowed without departing from the scope of the described embodiments. For example, an order of operations described in the flowchart is non-restricted, so an order of two or more operations illustrated in and described according to the flowchart can be changed according to several embodiments. As another example, in several embodiments, one or more operations illustrated in the flowchart and described according to the flowchart are optional or can be deleted. In addition, some steps or functions may be added to the disclosed embodiments, or more than two steps may be replaced in sequence. All such variations are considered to be included in the disclosed embodiments and the claims.

In addition, terminology is used in the above technical descriptions to provide a thorough understanding of the described embodiments. However, too much detail is not required to implement the described embodiments. Therefore, the above description of embodiments has been presented for illustration and description. The embodiments presented in the above description and the examples disclosed according to these embodiments are provided separately to add context and help to understand the described embodiments. The above description is not intended to be exhaustive or to limit the described embodiments to the precise form of the disclosure. According to the above teaching, several modifications, alternative applications and variations are possible. In some cases, well-known processing steps are not described in detail to avoid unnecessarily affecting the described embodiments.

What is claimed is:

1. A method for computing device maintenance implemented by an executive device integrated in a computing device or in a maintenance device, comprising:
monitoring an operating status of the computing device;
sending a notification message to the maintenance device upon determining that the computing device operates abnormally, wherein the notification message is used to notify that the computing device operates abnormally, and is used to notify to restart the computing device;
receiving a restart instruction sent by the maintenance device according to the notification message; and
controlling the computing device to restart according to the restart instruction,
wherein the monitoring the operating status of the computing device comprises:
acquiring current data processing hash rate of the computing device; and
determining whether the computing device operates abnormally according to the current data processing hash rate of the computing device;
wherein the determining whether the computing device operates abnormally according to the current data processing hash rate of the computing device comprises:
determining that the computing device operates abnormally upon determining the current data processing hash rate is less than an abnormal hash rate threshold; or,
determining that the computing device operates abnormally upon determining a duration of the current data processing hash rate being less than the abnormal hash rate threshold reaches a duration threshold,
wherein the notification message carries operating status information of the computing device and an abnormal operation identifier,
wherein the abnormal operation identifier is used to indicate that the computing device operates abnormally, and
after receiving the operating status information and the abnormal operation identifier, the maintenance device determines that the computing device operates abnormally by processing the operating status information of the computing device.

2. The method according to claim 1, wherein the method further comprises:
acquiring the abnormal hash rate threshold.

3. The method according to claim 2, wherein the acquiring the abnormal hash rate threshold comprises:
acquiring standard data processing hash rate of the computing device; and
acquiring a product of the standard data processing hash rate and a preset abnormal ratio, to obtain the abnormal hash rate threshold.

4. The method according to claim 3, wherein the standard data processing hash rate comprises: factory data processing hash rate or initial data processing hash rate, and the initial data processing hash rate being data processing hash rate when the computing device initially starts to operate.

5. The method according to claim 3, wherein the acquiring standard data processing hash rate of the computing device comprises:
acquiring factory data processing hash rate recorded by a data processing chip of the computing device, as the standard data processing hash rate.

6. A non-transitory computer-readable storage medium storing computer-executable instructions, wherein the computer-executable instructions are set to execute the method according to claim 1.

7. An apparatus for computing device maintenance, comprising:
a memory, a transceiver and a processor, wherein the memory, the transceiver and the processor are connected through a bus, the memory is configured to store computer programs, and the transceiver is configured to communicate with other devices;
the processor is configured to execute the computer programs to monitor an operating status of a computing device; and
the transceiver is configured to send a notification message to a maintenance device upon determining that the computing device operates abnormally, wherein the notification message is used to notify that the computing device operates abnormally, and is used to notify to restart the computing device;
wherein the processor is further configured to:
acquire current data processing hash rate of the computing device;
determine whether the computing device operates abnormally according to the current data processing hash rate of the computing device; and
determine that the computing device operates abnormally upon determining that the current data processing hash rate is less than an abnormal hash rate threshold, or determine that the computing device operates abnormally upon determining that a duration of the current data processing hash rate being less than the abnormal hash rate threshold reaches a duration threshold,
wherein the transceiver is further configured to receive a restart instruction sent by the maintenance device according to the notification message,
wherein the processor is further configured to control the computing device to restart according to the restart instruction,
wherein the notification message carries operating status information of the computing device and an abnormal operation identifier,
wherein the abnormal operation identifier is used to indicate that the computing device operates abnormally, and
after receiving the operating status information and the abnormal operation identifier, the maintenance device determines that the computing device operates abnormally by processing the operating status information of the computing device.

8. The apparatus according to claim 7, wherein the processor is further configured to:
acquire standard data processing hash rate of the computing device; and
acquire a product of the standard data processing hash rate and a preset abnormal ratio, to obtain the abnormal hash rate threshold.

9. The apparatus according to claim 8, wherein the standard data processing hash rate comprises: factory data processing hash rate or initial data processing hash rate, and the initial data processing hash rate being data processing hash rate when the computing device initially starts to operate.

10. The apparatus according to claim 8, wherein the processor is further configured to:
acquire factory data processing hash rate recorded by a data processing chip of the computing device, as the standard data processing hash rate.

\* \* \* \* \*